(12) United States Patent
Arai et al.

(10) Patent No.: US 9,576,602 B2
(45) Date of Patent: Feb. 21, 2017

(54) FLEXURE WITH CONDUCTORS FOR MULTI-READER

(71) Applicant: NHK SPRING CO., LTD., Yokohama-shi, Kanagawa (JP)

(72) Inventors: Hajime Arai, Aiko-gun (JP); Futa Sasaki, Aiko-gun (JP)

(73) Assignee: NHK SPRING CO., LTD., Yokohama-Shi, Kanagawa (JP)

( * ) Notice: Subject to any disclaimer, the term of this patent is extended or adjusted under 35 U.S.C. 154(b) by 0 days.

(21) Appl. No.: 15/099,310

(22) Filed: Apr. 14, 2016

(65) Prior Publication Data

US 2016/0336031 A1    Nov. 17, 2016

(30) Foreign Application Priority Data

May 11, 2015 (JP) ................. 2015-096389

(51) Int. Cl.
    *G11B 5/48*       (2006.01)
(52) U.S. Cl.
    CPC ............. *G11B 5/486* (2013.01); *G11B 5/4853* (2013.01)
(58) Field of Classification Search
    CPC .................................................. G11B 5/4853
    USPC ...................................................... 360/245.9
    See application file for complete search history.

(56) References Cited

U.S. PATENT DOCUMENTS

| | | | |
|---|---|---|---|
| 7,609,482 B2 | 10/2009 | Kiyono | |
| 7,684,153 B2 | 3/2010 | Ohtsu et al. | |
| 7,813,084 B1 * | 10/2010 | Hentges | G11B 5/486 360/245.9 |
| 9,076,470 B2 * | 7/2015 | Miura | G11B 5/484 |
| 9,431,042 B2 * | 8/2016 | Roen | G11B 5/486 |
| 2008/0062567 A1 * | 3/2008 | Toukairin | G11B 5/486 360/235.4 |
| 2009/0190263 A1 * | 7/2009 | Miura | G11B 5/4853 360/245.8 |
| 2009/0195935 A1 * | 8/2009 | Choi | G11B 5/4853 360/245.4 |
| 2011/0292549 A1 * | 12/2011 | Arai | G11B 5/486 360/245.8 |

FOREIGN PATENT DOCUMENTS

| | | |
|---|---|---|
| JP | 06215322 A | 8/1994 |
| JP | 2006048800 A | 2/2006 |
| JP | 2006331485 A | 12/2006 |
| JP | 2011134372 A | 7/2011 |

* cited by examiner

*Primary Examiner* — Jefferson Evans

(74) *Attorney, Agent, or Firm* — Holtz, Holtz & Volek PC

(57) ABSTRACT

A flexure for mounting a plurality of reproduction elements thereon includes a metal base and an interconnection part. The metal base includes a first area, and a second area in which a window portion is formed. The interconnection part includes an insulating layer including a first lane which covers the first area and a second lane which covers the second area, a write trace pair connected to a recording element, read trace pairs provided on the second lane to face the window portion and connected to reproduction elements, respectively, and a ground trace arranged between two adjacent read trace pairs and provided with grounding points at two end portions.

11 Claims, 12 Drawing Sheets

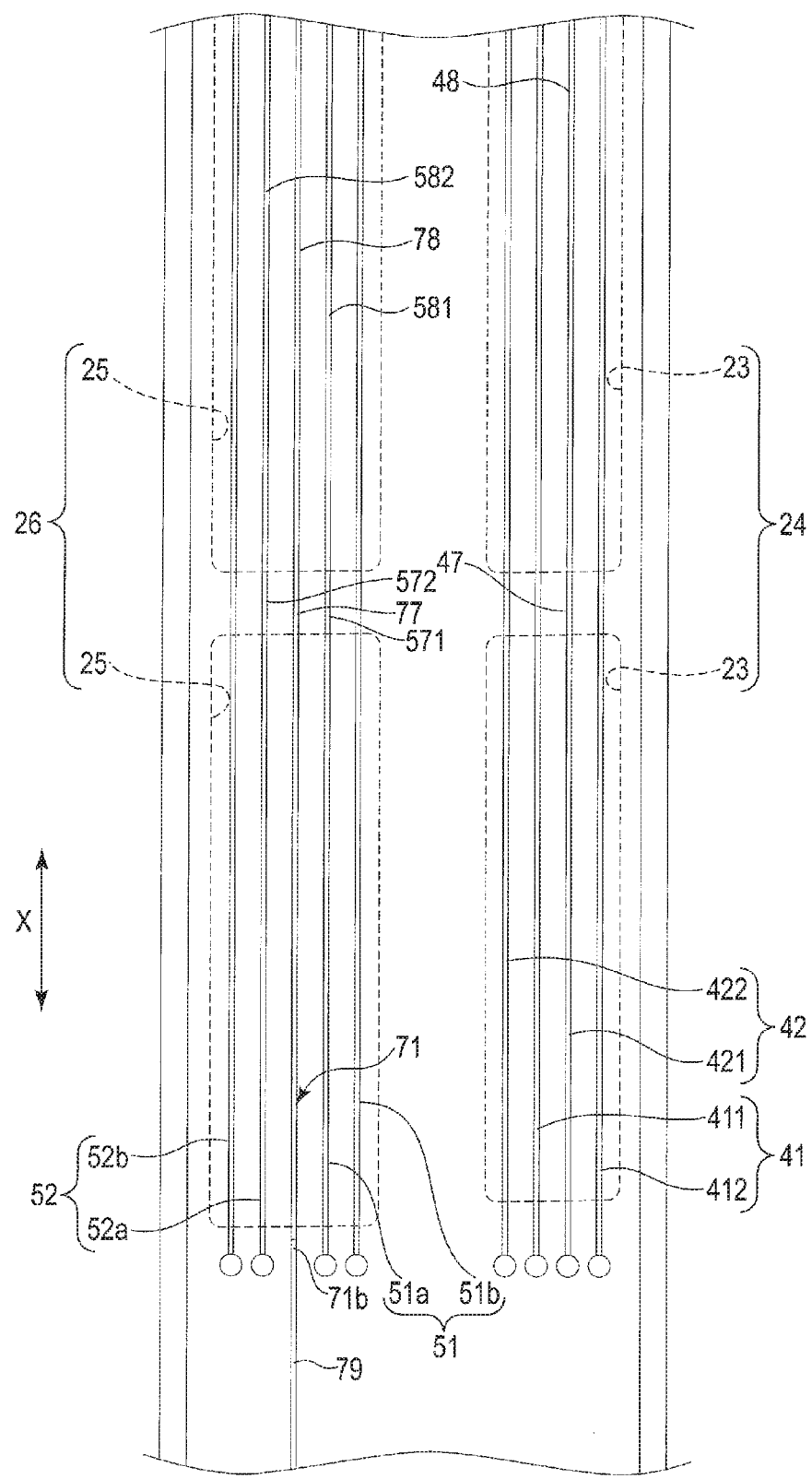
F I G. 13

FLEXURE WITH CONDUCTORS FOR MULTI-READER

CROSS-REFERENCE TO RELATED APPLICATIONS

This application is based upon and claims the benefit of priority from prior Japanese Patent Application No. 2015-096389, filed May 11, 2015, the entire contents of which are incorporated herein by reference.

BACKGROUND OF THE INVENTION

1. Field of the Invention

The present invention relates to improvement of electrical characteristics in a flexure with conductors for a multi-reader which is mounted in a hard disk drive, for example.

2. Description of the Related Art

As hard disk drives increase in capacity while their sizes have been reduced, a further improvement in recording density of a magnetic disk is desired. In order to realize the above, improvement in track density in addition to a liner density of the magnetic disk is desired. However, reducing track width causes a problem of displacement of recording data in the magnetic disk and a reproduction element of a magnetic head.

With respect to this problem, as disclosed in JPH06-215322 A (Patent Literature 1), a method of simultaneously reproducing recording data and a displacement signal and making a correction by providing two reproduction elements (a multi-reader) in a magnetic head has been proposed. Further, as the developed form of the above method, a method of reproducing two-dimensional magnetic recording (TDMR) by a plurality of reproduction elements has been proposed, as disclosed in JP 2011-134372 A (Patent Literature 2). A flexure for mounting a magnetic head comprising a plurality of reproduction elements thereon will be hereinafter referred to as a flexure with conductors for a multi-reader. In the flexure with conductors for a multi-reader, pairs of read traces corresponding to the reproduction elements, respectively, are provided.

The impedance of each pair of read traces should preferably be decreased in order to match the impedance of the read trace pair with that of reproduction elements, etc., and also to reduce power consumption. In an ordinary flexure with conductors comprising a pair of read traces, a window portion is formed by etching on a metal base of an area in which the pair of read traces (the read trace pair) is arranged, thereby adjusting the impedance value. Also in a flexure with conductors for a multi-reader comprising a plurality of read trace pairs, forming a window portion for each of the read trace pair is considered.

However, since the minimum width of a metal base which can be formed by general chemical etching in flexure manufacturing is limited, if an interconnection part continues to be denser and denser as a result of miniaturization of the flexure, it becomes difficult to form an independent window portion in each of the read trace pairs. Hence, in order to reduce the size of the flexure with conductors for a multi-reader, one idea is to form a shared window portion with respect to a plurality of pairs of read trace.

However, if such a window portion is formed, the positional relationship between a positive (a positive phase signal) read trace and a negative (a reverse phase signal) read trace, which constitute a pair of read traces, and the window portion (the external form of a ground) becomes asymmetrical. If the capacitance of the read traces becomes unbalanced between the positive and negative phases, the capability of the read trace pair which removes noise by transmitting a differential signal as a pair is lowered. In this case, the read trace pair is likely to be affected by crosstalk (noise) from a write trace pair.

Up to the present, various technologies for suppressing crosstalk in a pair of read traces which transmit a differential signal have been proposed with respect to an ordinary flexure with conductors for a single reader. Meanwhile, technologies for suppressing crosstalk in pairs of read traces in a flexure with conductors for a multi-reader are barely known. For example, even if a crosstalk suppression technology intended for a flexure with conductors for a single reader as disclosed in JP 2006-48800 A (Patent Literature 3) or JP 2006-331485 A (Patent Literature 4) is applied to a flexure with conductors for a multi-reader, the applied technology will not bring about any advantage or will induce an adverse reaction on the contrary.

BRIEF SUMMARY OF THE INVENTION

The present invention provides a flexure, more specifically, a flexure with conductors for a multi-reader for mounting a magnetic head comprising a plurality of reproduction elements thereon, which is able to satisfy both the space-saving and good electrical characteristics.

A flexure according to an embodiment is a flexure for mounting a recording element and a plurality of reproduction elements thereon, and comprises a metal base and an interconnection part formed on the metal base. The metal base comprises a first area extending in a longitudinal direction of the metal base, and a second area extending along the first area and in which a window portion is formed. The interconnection part comprises: an insulating layer comprising a first lane which covers the first area, and a second lane which covers both the window portion and the second area; a write trace pair constituted of a first write trace and a second write trace which form a pair and transmit a differential signal; read trace pairs each constituted of a first read trace and a second read trace which form a pair and transmit a differential signal; and a ground (GND) trace which comprises a first end portion and a second end portion, and is provided with grounding points at the first end portion and the second end portion. The write trace pair is provided on the first lane and is connected to the recording element. The read trace pairs are provided on the second lane to face the window portion in a thickness direction of the metal base, and connected to the reproduction elements, respectively. The ground trace is arranged between two adjacent read trace pairs.

In this embodiment, the first read trace and the second read trace may be arranged such that a distance between the first read trace and the ground trace is substantially equal to a distance between the second read trace and an edge of the window portion. Also, when the read trace pairs include a first read trace pair, which is closest to the write trace pair, and a second read trace pair, which is close to the write trace pair next to the first read trace pair, the ground trace may be arranged between the first read trace pair and the second read trace pair.

Alternatively, the ground trace may be arranged between all adjacent read trace pairs. Further, the ground trace may comprise an additional grounding point which is further provided at a point between the first end portion and the second end portion of the ground trace. A width of the ground trace, a width of the first read trace, and a width of the second read trace may be substantially equal to each other. The interconnection part may comprise an additional conductor arranged in a portion other than over the second lane. The ground trace may comprise an extended portion which extends from the first end portion and/or the second end portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 13 is an illustration which schematically depicts an interconnection part according to a fourteenth embodiment.

DETAILED DESCRIPTION OF THE INVENTION

Figure 1:
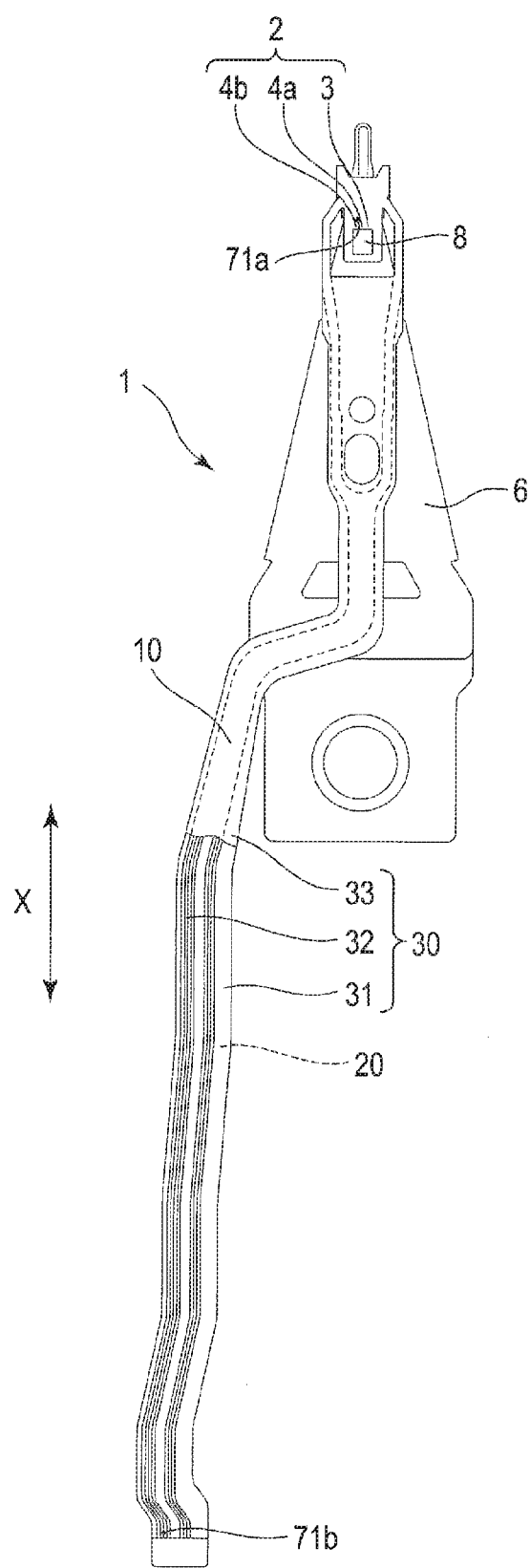
FIG. 1 is a perspective view showing an example of a head gimbal assembly.

First, a structure which is common to embodiments will be described with reference to FIG. 1. A head gimbal assembly (HGA) 1 shown in FIG. 1 comprises a slider 8 which constitutes a magnetic head 2, a load beam 6 formed like a plate spring, a flexure 10 with conductors for a multi-reader (which may be hereinafter referred to simply as a flexure 10) which is secured to the load beam 6, and on which the slider 8 is mounted near its distal end, etc. The magnetic head 2 comprises a recording element 3 and a plurality of (for example, two) reproduction elements 4a and 4b.

The flexure 10 includes a metal base 20 obtained by etching a metal leaf of austenitic stainless steel, for example, and an interconnection part 30 formed along the metal base 20.

The thickness of the metal base 20 is less than that of the load beam 6. The thickness of the load beam 6 is, for example, 30 to 62 μm, and the thickness of the metal base 20 is, for example, 18 μm (12 to 25 μm). The metal base 20 is secured to the load beam 6 by a plurality of welds formed by, for example, laser welding. The direction indicated by arrow X in FIG. 1 is the longitudinal direction of the metal base 20 (the flexure 10).

[First Embodiment]

Figure 2:
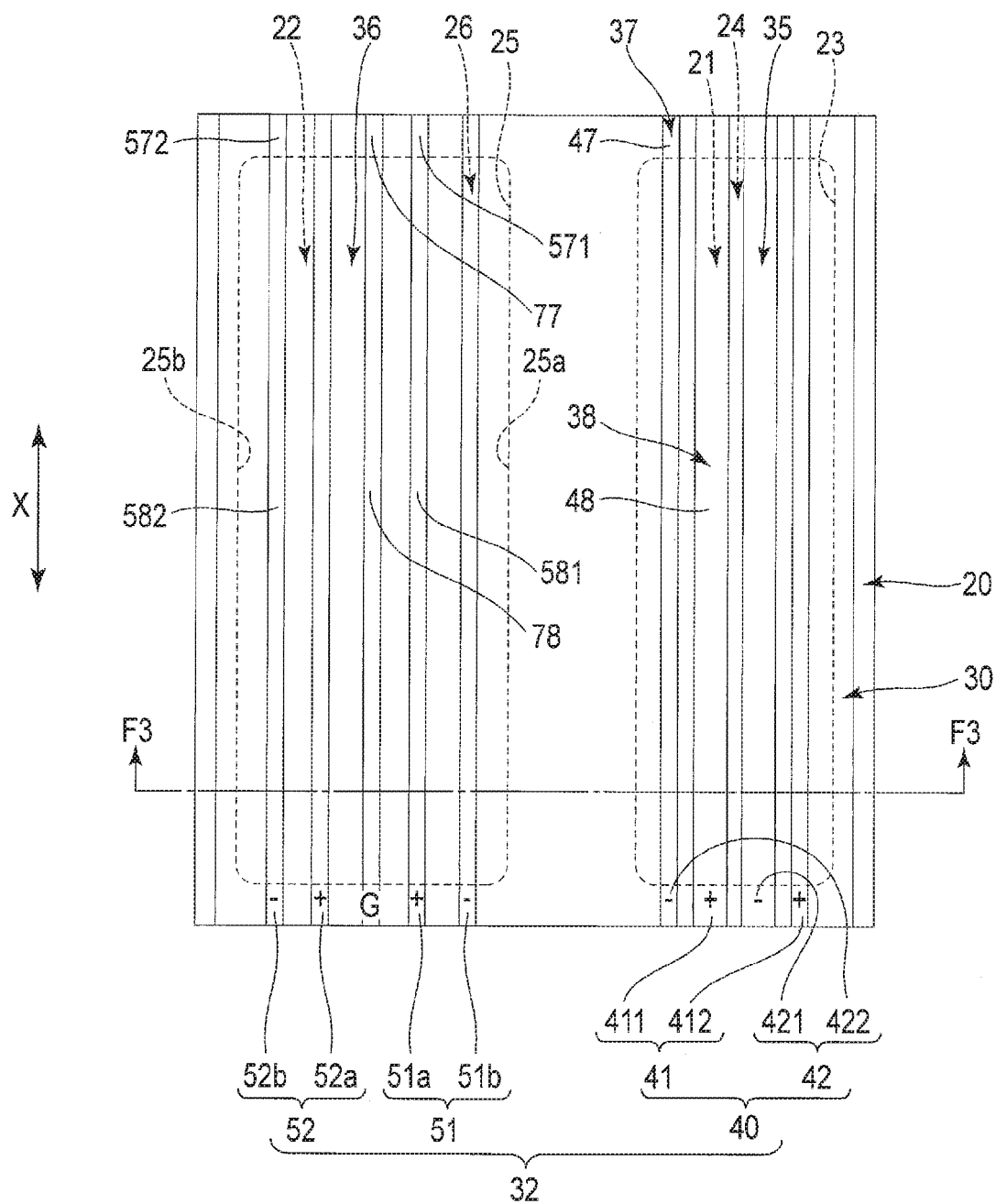
FIG. 2 is an illustration which schematically depicts an interconnection part according to a first embodiment.
Figure 3:
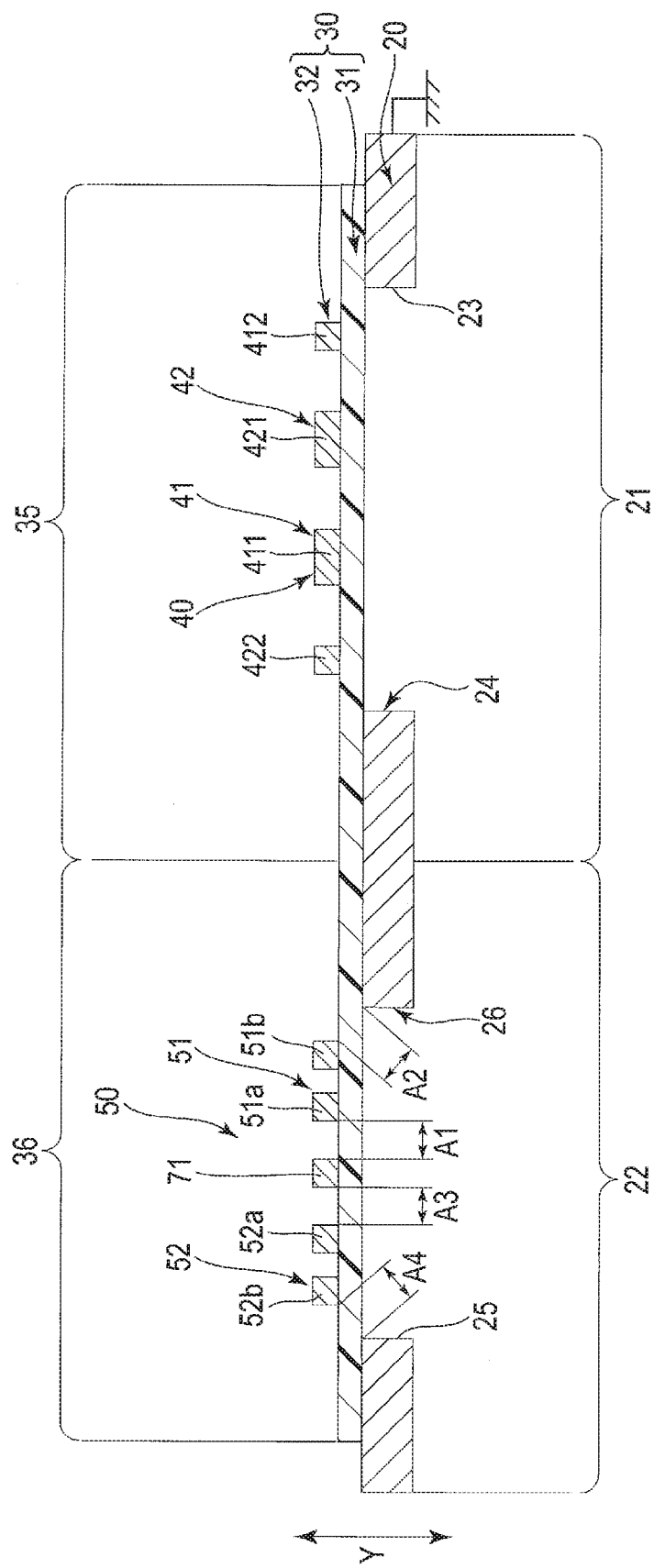
FIG. 3 is a cross-sectional view of the interconnection part taken along line F3-F3, of FIG. 2.

Referring to FIGS. 2 and 3, the flexure 10 according to the first embodiment will be described. FIG. 2 is an illustration which schematically depicts the interconnection part 30 according to the present embodiment. The metal base 20 of the flexure 10 comprises a first area 21 extending in the longitudinal direction X, and a second area 22 extending along the first area 21.

In the first area 21, a window portion 24 formed of a plurality of long holes (openings) 23 which are arranged in a line in the longitudinal direction X is formed. In the second area 22, a window portion 26 formed of a plurality of long holes (openings) 25 which are arranged in a line in the longitudinal direction X is formed. Each of the long holes 23 and 25 penetrates the metal base 20 in a thickness direction Y (i.e., indicated by arrow Y in FIG. 3). Alternatively, the window portion 26 may be formed of one long hole (opening) structured by connecting the long holes 25 which constitute the window portion 26 to each other.

FIG. 3 is a cross-sectional view of the interconnection part taken along line F3-F3 of FIG. 2. The interconnection part 30 includes an insulating layer 31, a plurality of conductors 32 made of copper which are formed on the insulating layer 31, and a cover layer 33 (FIG. 1). Note that for the sake of explanation, in the flexure 10 illustrated in FIGS. 2 to 13, the cover layer 33 is omitted. Each of the insulating layer 31 and the cover layer 33 is formed of an electrically insulating material such as polyimide. The thickness of the insulating layer 31 is, for example, 10 μm (3 to 18 μm). The thickness of the conductor 32 is, for example, 9 μm (3 to 18 μm). The thickness of the cover layer 33 is, for example, 4 μm (1 to 10 μm).

The insulating layer 31 includes a first lane 35, and a second lane 36. The first lane 35 covers the window portion 24 of the metal base 20, and also the first area 21. The second lane 36 covers the window portion 26 of the metal base 20, and also the second area 22. The first lane 35 and the second lane 36 may be provided to be spaced apart from each other, or provided without an interval as illustrated in the example.

The plurality of conductors 32 include a write trace pair 40 provided on the first lane 35, a first read trace pair 51 and a second read trace pair 52 provided on the second lane 36, a ground trace 71, etc. The first and second read trace pairs 51 and 52 are one example of the read trace pair of the present invention, and may be simply referred to as read trace pairs 51 and 52. In addition, a plurality of read trace pairs may be called a read trace structure 50 as a whole.

As shown in FIG. 2, the write trace pair 40 is constituted of a positive write trace 41 and a negative write trace 42, which form a pair and transmit a differential signal, and is connected to the recording element 3. The positive (positive phase signal) write trace 41 transmits a signal which fluctuates between high- and low-level binary values. The negative (reverse phase signal) write trace 42 transmits a signal which fluctuates between the binary values at an opposite phase with respect to the signal of the positive write trace 41. The positive write trace 41 is an example of a write trace of the pair of write traces of the present invention (which may also be referred to as a first write trace), and branches into a first interleaved conductor 411 and a second interleaved conductor 412. The negative write trace 42 is an example of the other write trace of the pair of write traces of the present invention (which may also be referred to as a second write trace), and branches into a first interleaved conductor 421 and a second interleaved conductor 422.

The write trace pair 40 (the first and second interleaved conductors 411, 412, 421, and 422 of the positive and negative write traces 41 and 42) is provided on the first lane 35 such that it faces the window portion 24 of the first area 21 of the metal base 20 in the thickness direction Y.

The first read trace pair 51 is constituted of a positive read trace 51a and a negative read trace 51b, which form a pair and transmit a differential signal, and is connected to the reproduction element 4a. The positive (positive phase signal) read trace 51a transmits a signal which fluctuates between high- and low-level binary values. The negative (reverse phase signal) read trace 51b transmits a signal which fluctuates between the binary values at an opposite phase with respect to the signal of the positive read trace 51a.

The second read trace pair 52 is constituted of a positive read trace 52a and a negative read trace 52b, which form a pair and transmit a differential signal, and is connected to the reproduction element 4b. The positive (positive phase signal) read trace 52a transmits a signal which fluctuates between high- and low-level binary values. The negative (reverse phase signal) read trace 52b transmits a signal which fluctuates between the binary values at an opposite phase with respect to the signal of the positive read trace 52a. Each of the positive read traces 51a and 52a is an example of a read trace of the pair of read traces of the present invention (which may be referred to as a first read trace). Each of the negative read traces 51b and 52b is an example of the other read trace of the pair of read traces of the present invention (which may be referred to as a second read trace). Further, each of the positive and negative write traces 41 and 42, and the positive and negative read traces 51a, 51b, 52a, and 52b may be referred to as a signal line. Note that the terms "positive" and "negative" used for the signal lines do not restrict the polarity of signals (i.e., whether the potential is negative or positive). That is, a signal which fluctuates between the high- and low-level binary values may be at the positive potential or the negative potential.

The first read trace pair 51 and the second read trace pair 52 (the positive and negative read traces 51a, 51b, 52a, and 52b) are provided on the second lane 36 such that they face the window portion 26 of the second area 22 of the metal base 20 in the thickness direction Y.

The ground trace 71 is provided on the second lane 36 such that it faces the window portion 26 of the second area 22 of the metal base 20 in the thickness direction Y, and is disposed between the first and the second read trace pairs. The minimum width of the ground trace 71 is the same as the minimum width of each of the positive and negative read traces 51a, 51b, 52a, and 52b, and is, for example, 12 μm. The ground trace 71 and the positive and negative read traces 51a, 51b, 52a, and 52b may all be formed of the same width (for example, the minimum width). The ground trace 71 comprises a first end portion 71a, and a second end portion 71b which is on the opposite side of the first end portion 71a. Further, in the example of FIG. 1, the first end portion 71a is disposed near a distal end of the flexure 10, and the second end portion 71b is disposed on a proximal end portion of the flexure 10. In the present specification, the first and second end portions refer to not only tail end surfaces of the ground trace 71, but also portions near the tail end surfaces of the ground trace 71 which have some length in the longitudinal direction.

In the ground trace 71, grounding points are provided at the first and second end portions (both ends) 71a and 71b, respectively. In the grounding point, a hole which penetrates the insulating layer 31 is formed, and nickel plating or copper plating is filled in this hole. The ground trace 71 is electrically connected (grounded) to the metal base 20 at the first and second end portions 71a and 71b.

Also, the conductors 32 (the write trace pair 40, the first and the second read trace pairs 51 and 52, and the ground trace 71) include an overlapping portion 37 and a non-overlapping portion 38. The overlapping portion 37 is where a portion not having the window portions 24 and 26 (the long holes 23 and 25) of the metal base 20 overlaps the conductors 32 in the thickness direction Y. The non-overlapping portion 38 is where the window portions 24 and 26 overlap the conductors 32 in the thickness direction Y.

The overlapping portion 37 of the conductors 32 includes an overlapping portion 47 of the write trace pair 40, an overlapping portion 571 of the first read trace pair 51, an overlapping portion 572 of the second read trace pair 52, and an overlapping portion 77 of the ground trace 71. The non-overlapping portion 38 of the conductors 32 includes a non-overlapping portion 48 of the write trace pair 40, a non-overlapping portion 581 of the first read trace pair 51, a non-overlapping portion 582 of the second read trace pair 52, and a non-overlapping portion 78 of the ground trace 71. The grounding point of the ground trace 71 is provided in the overlapping portion 77.

In the present embodiment, as shown in FIG. 3, in the first read trace pair 51, distance A1 between the positive read trace 51a and the ground trace 71 is substantially equal to distance A2 between the negative read trace 51b and an edge of the window portion 26. In the second read trace pair 52, distance A3 between the positive read trace 52a and the ground trace 71 is substantially equal to distance A4 between the negative read trace 52b and an edge of the window portion 26. Note that the edges of the window portion 26 in the present specification refer to edges corresponding to long sides 25a and 25b along the longitudinal direction X of an edge portion of the long hole 25 shown in FIG. 2.

According to the structure described above, in the flexure 10 with conductors for a multi-reader, the impedance values of the first and second read trace pairs 51 and 52 can be adjusted by the window portion 26. Here, in the positive and negative read traces 51a and 51b which constitute the first read trace pair 51, distance A1 is equal to distance A2, and in the positive and negative read traces 52a and 52b which constitute the second read trace pair 52, distance A3 is equal to distance A4. Consequently, in a pair of positive and negative read traces 51a and 51b, and a pair of positive and negative read traces 52a and 52b, the capacitance to be formed does not become asymmetrical. As a result, crosstalk that affects the first and second read trace pairs 51 and 52 caused by the write trace pair 40 can be suppressed.

Further, in the present embodiment, a frame portion 29 (FIG. 4) is omitted. The present embodiment can satisfy both the space-saving and improvement of electrical characteristics. The above feature will be described in detail later in comparison with the other embodiments.

Next, referring to FIGS. 4 to 13, a flexure 10 according to each of second to fourteenth embodiments will be described. Note that in each of the embodiments, for a structure having a function which is the same as that of the first embodiment, the same reference number is added. The descriptions of the first embodiment should be referred to for a detailed explanation of the elements corresponding to the respective reference numbers.

[Second Embodiment]

Figure 4:
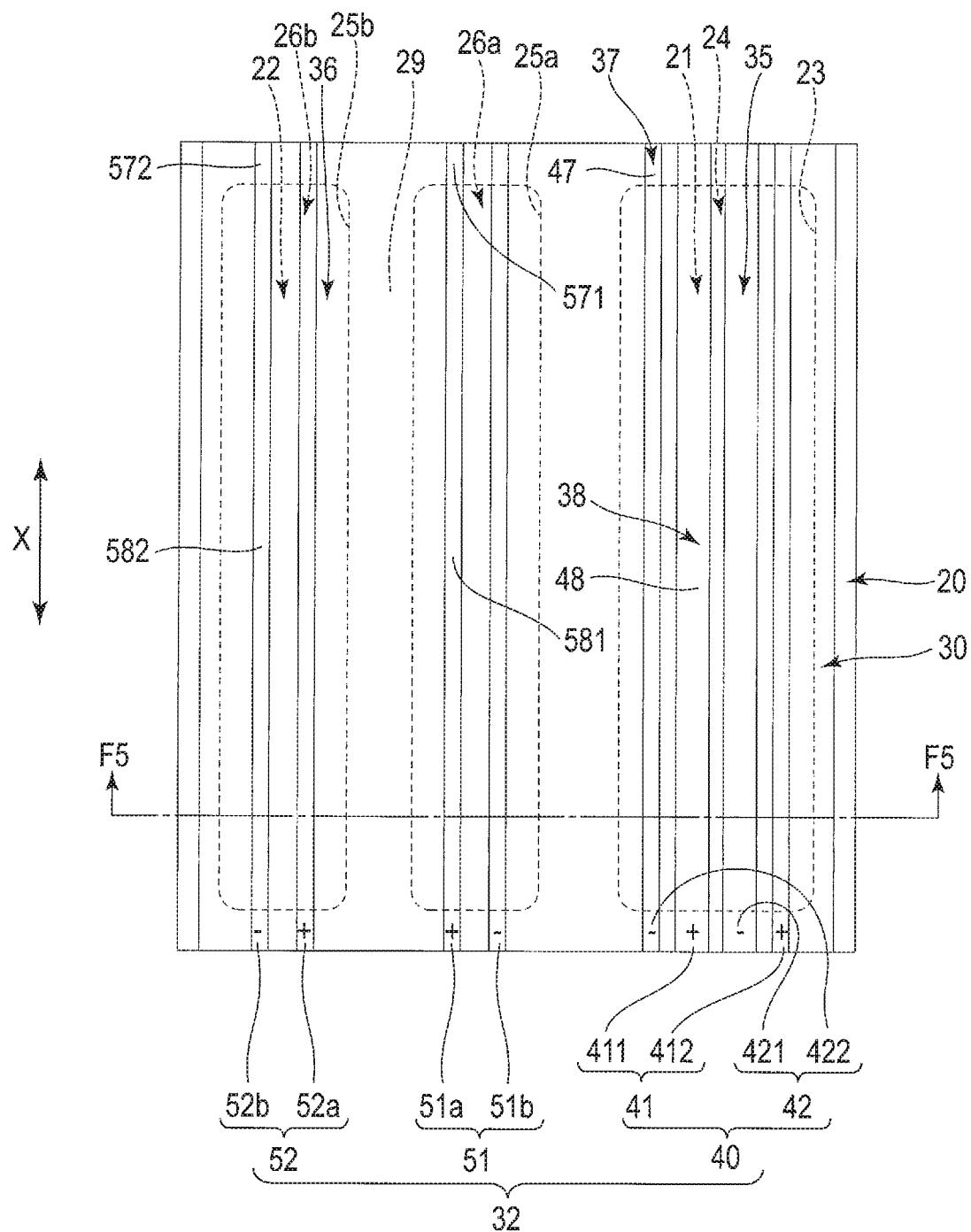
FIG. 4 is an illustration which schematically depicts an interconnection part according to a second embodiment.
Figure 5:
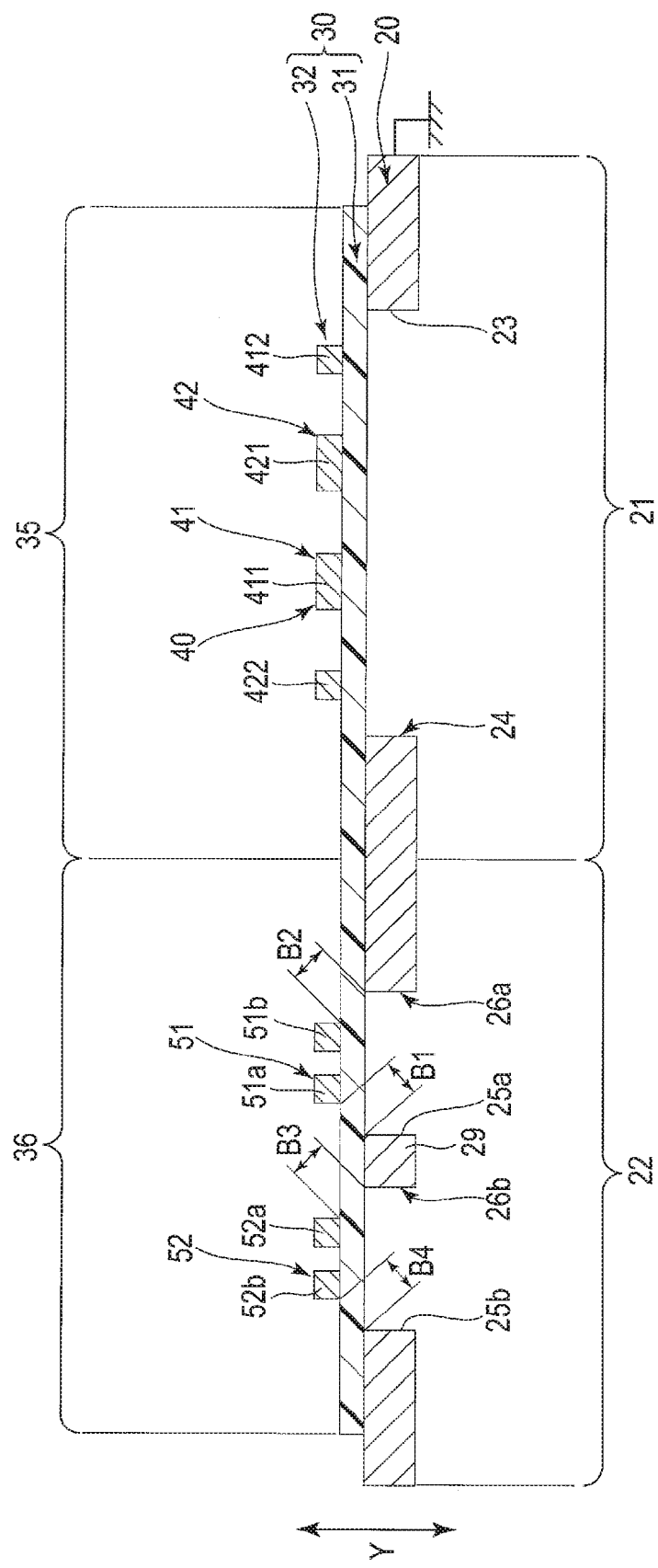
FIG. 5 is a cross-sectional view of the interconnection part taken along line F5-F5 of FIG. 4.

Referring to FIGS. 4 and 5, a flexure 10 according to the second embodiment will be described. It should be noted that the second embodiment may also be referred to as a first reference example. The second embodiment is different from the first embodiment in that two independent, window portions 26a and 26b are formed instead of the window portion 26, and that no ground trace 71 is provided. The other structures are the same as the structures of the first embodiment.

FIG. 4 is an illustration which schematically depicts an interconnection part 30 according to the second embodiment. In a second area 22, two independent window portions 26a and 26b are formed. The window portion 26a is formed of a plurality of long holes (openings) 25a which are arranged in a line in the longitudinal direction X. The window portion 26b is formed of a plurality of long holes (openings) 25b which are arranged in a line in the longitudinal direction X. Each of the long holes 25a and 25b penetrates a metal base 20 in a thickness direction Y (i.e., indicated by arrow Y in FIG. 3). A region between the window portions 26a and 26b is formed as the frame portion 29 in which the metal base 20 is left lake a band. In the case of the metal base 20 which is 18 μm thick, the minimum width of the frame portion 29 which can be formed by general etching is, for example, 40 μm.

A first read trace pair 51 (positive and negative read traces 51a and 51b) is provided on a second lane 36 such that it faces the window portion 26a of the second area 22 of the metal base 20 in the thickness direction Y. A second read trace pair 52 (positive and negative read traces 52a and 52b) is provided on the second lane 36 such that it faces the window portion 26b in the thickness direction Y.

The first and the second read trace pairs 51 and 52 include an overlapping portion 57 and a non-overlapping portion 58. The overlapping portion 57 is where a portion not having the window portions 26a and 26b (the long holes 25a and 25b) of the metal base 20 overlaps the first and the second read trace pairs 51 and 52 in the thickness direction Y. The non-overlapping portion 58 is where the window portions 26a and 26b overlap the first and the second read trace pairs 51 and 52 in the thickness direction Y.

In the second embodiment, as shown in FIG. 5, in the first read trace pair 51, distance B1 between the positive read trace 51a and an edge of the window portion 26a (the frame portion 29) is substantially equal to distance B2 between the negative read trace 51b and an edge of the window portion 26a. In the second read trace pair 52, distance B3 between the positive read trace 52a and an edge of the window portion 26b (the frame portion 29) is substantially equal to distance B4 between the negative read trace 52b and an edge of the window portion 26b.

According to the second embodiment, in the flexure 10 with conductors for a multi-reader, the impedance values of the first and second read trace pairs 51 and 52 can be adjusted by the window portions 26a and 26b. Here, in the positive and negative read traces 51a and 51b which constitute the first read trace pair 51, distances B1 and B2 to the edge of the window portion 26a are the same, and in the positive and negative read traces 52a and 52b which constitute the second read trace pair 52, distances B3 and B4 to the edge of the window portion 26b are the same. Consequently, in a pair of positive and negative read traces 51a and 51b, and a pair of positive and negative read traces 52a and 52b, the capacitance to be formed does not become asymmetrical. As a result, crosstalk that affects the first and second read trace pairs 51 and 52 caused by the write trace pair 40 can be suppressed.

[Third Embodiment]

Figure 6:
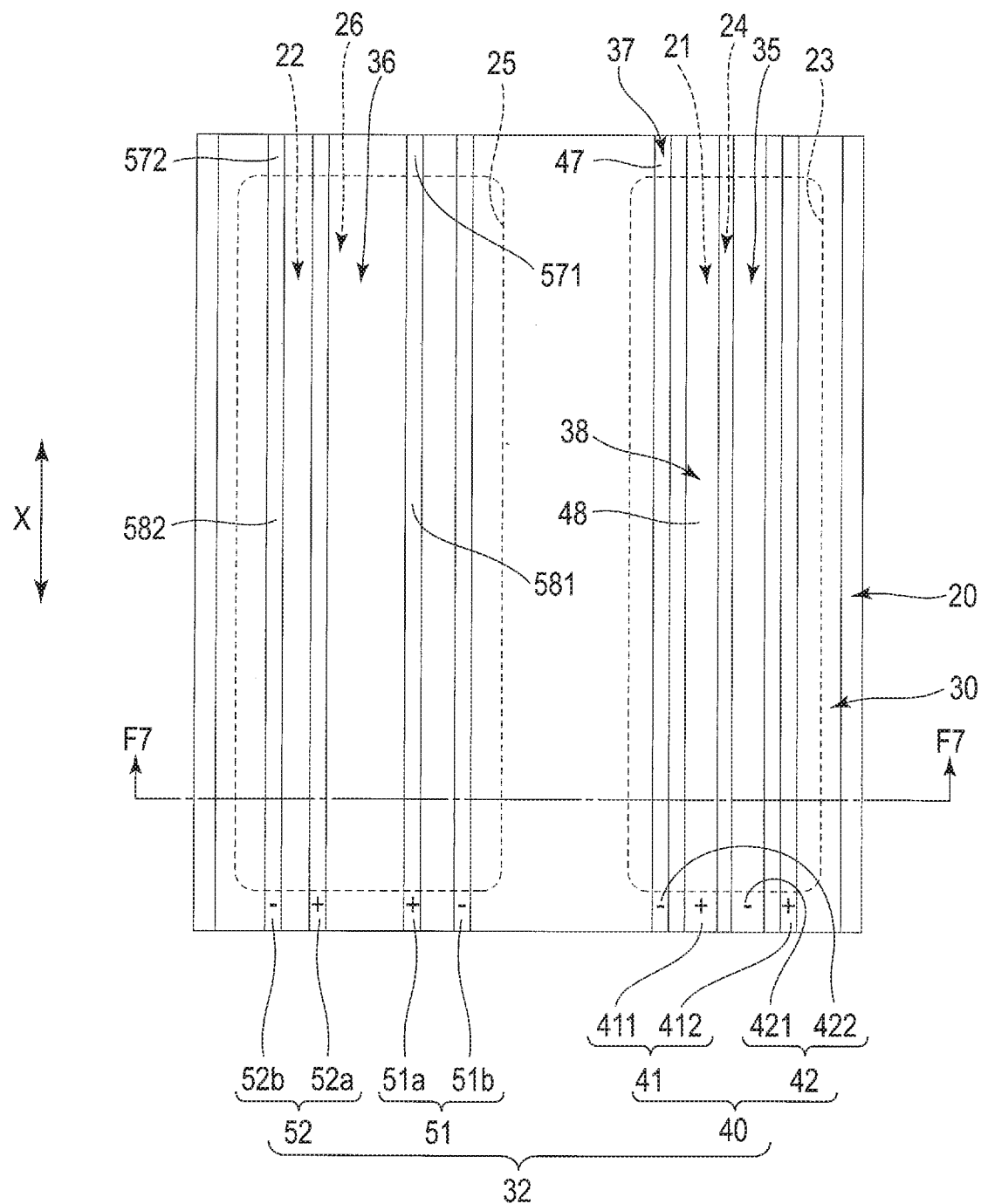
FIG. 6 is an illustration which schematically depicts an interconnection part according to a third embodiment.

A flexure 10 according to the third embodiment will be described with reference to FIGS. 6 and 7. It should be noted that the third embodiment may also be referred to as a second reference example. FIG. 6 is an illustration which schematically depicts an interconnection part 30 according to the third embodiment. The third embodiment is different from the first embodiment in that a ground trace 71 is not arranged between first and second read trace pairs. The other structures are the same as the structures of the first embodiment.

Figure 7:
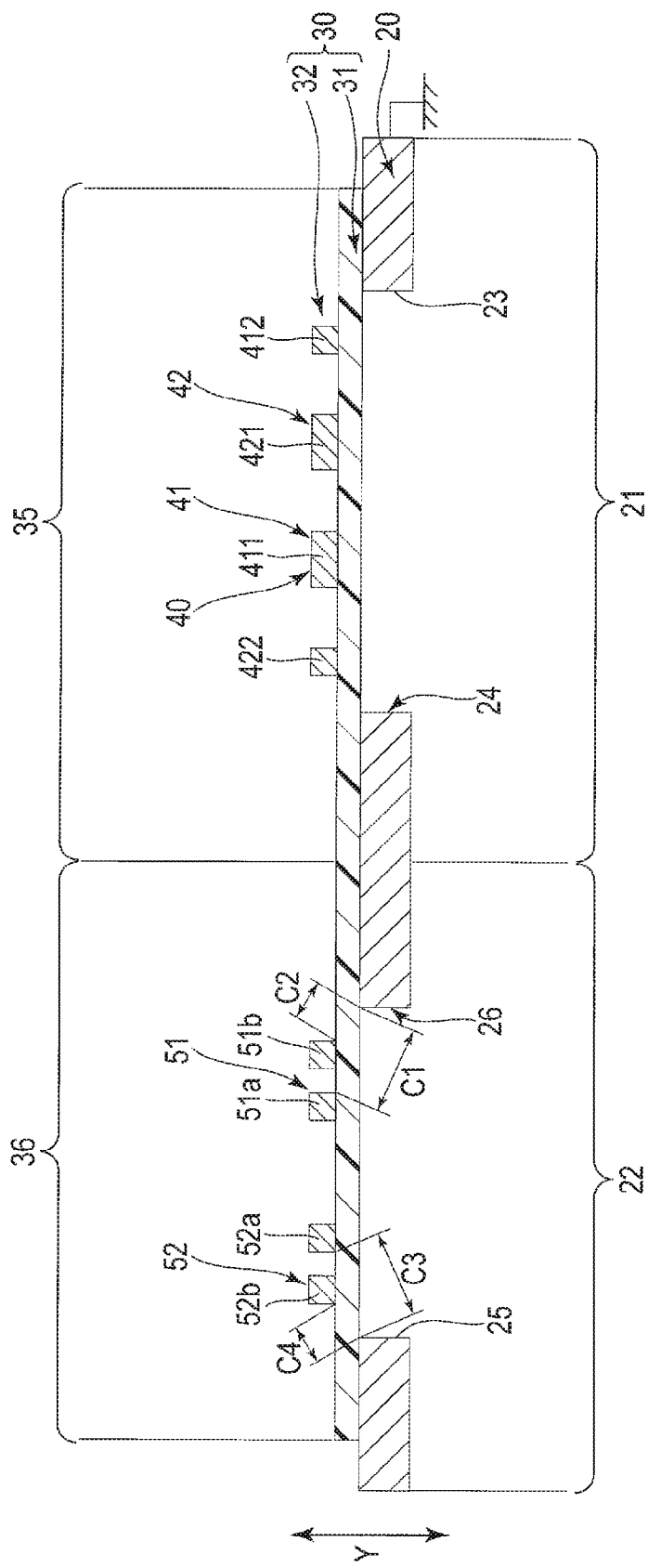
FIG. 7 is a cross-sectional view of the interconnection part taken along line F7-F7 of FIG. 6.

In the third embodiment, as shown in FIG. 7, in a first read trace pair 51, distance C1 between a positive read trace 51a and an edge of a window portion 26 is not equal to distance C2 between a negative read trace 51b and the edge of the window portion 26. In a second read trace pair 52, distance C3 between a positive read trace 52a and an edge of the window portion 26 is not equal to distance C4 between a negative read trace 52b and the edge of the window portion 26. Consequently, in a pair of positive and negative read traces 51a and 51b, and a pair of positive and negative read traces 52a and 52b, the capacitance to be formed becomes asymmetrical.

According to the structure of the third embodiment, in the flexure 10 with conductors for a multi-reader, the impedance values of the first and second read trace pairs 51 and 52 can be adjusted by the window portion 26. Also, in the third embodiment, a frame portion 29 (FIG. 4) described in the second embodiment is omitted. Since the frame portion 29 is not formed, the space of the metal base 20 can be saved. As a result, the degree of design freedom in designing the flexure 10 is improved, and a hard disk drive can be made compact.

Figure 8:
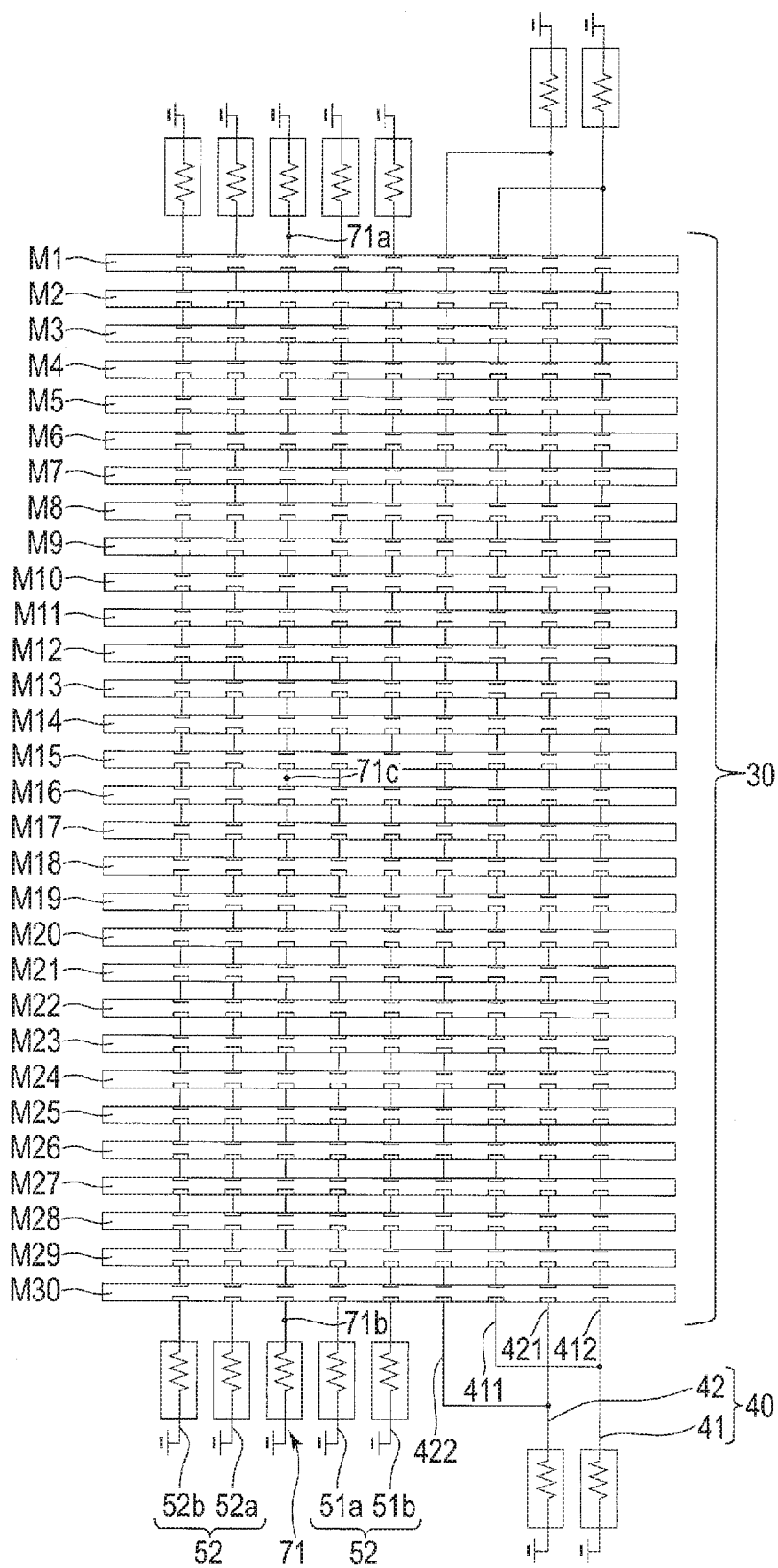
FIG. 8 is a schematic diagram showing a crosstalk analytical model of the interconnection part of each of the embodiments.
Figure 9:
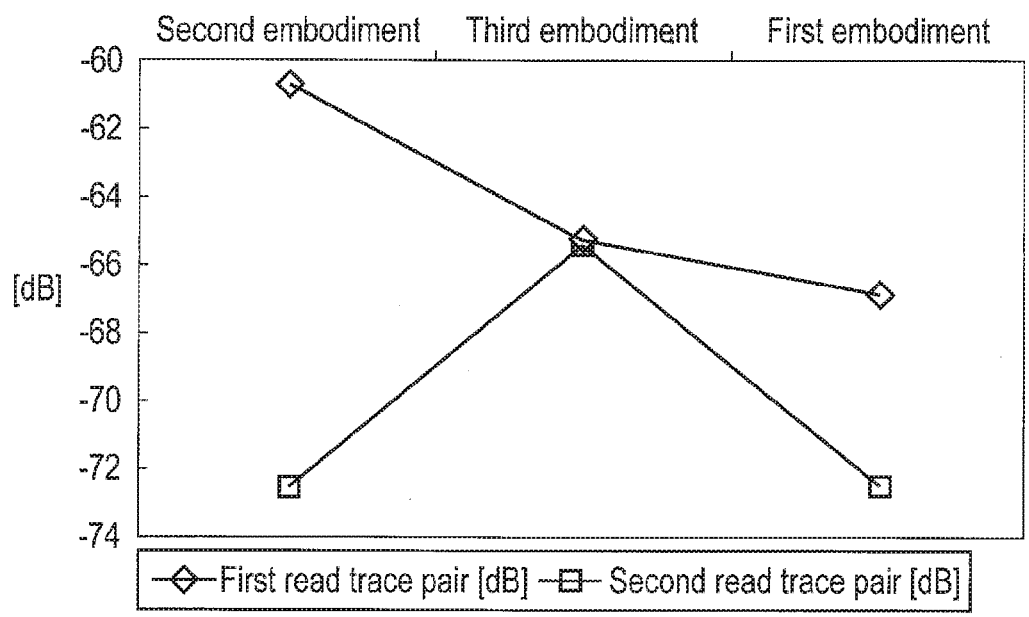
FIG. 9 is a characteristic diagram showing crosstalk that affects first and second read trace pairs according to the first to third embodiments calculated by the analytical model of FIG. 8.

Referring to FIGS. 8 and 9, the flexures 10 with conductors according to the first to third embodiments will be compared. FIG. 8 is an analytical model for simulating crosstalk that affects the interconnection part 30 according to each of the embodiments. The analytical model corresponding to each of the interconnection parts 30 of the embodiments having a length of 30 mm is configured by connecting thirty 1-mm models (M1 to M30) obtained by making a mesh division of the interconnection part 30 into 1-mm segments. FIG. 9 is a characteristic diagram showing a result of calculating the analytical model shown in FIG. 8 by a circuit simulator with respect to the crosstalk of the first to third embodiments. The vertical axis of the graph represents the crosstalk that affects the first and the second read trace pairs 51 and 52 caused by the write trace pair 40.

In comparing the third embodiment with the first embodiment, in both of the analytical results of the first read trace pair 51 and the second read trace pair 52, the crosstalk is more reduced in the first embodiment than in the third embodiment.

In comparing the second embodiment with the first embodiment, while the first embodiment and the second embodiment are not much different in the analytical result of the second read trace pair 52, the crosstalk is more reduced in the first embodiment than in the second embodiment in the analytical result of the first read trace pair 51.

Moreover, in the first embodiment, the frame portion 29 (FIG. 4) described in the second embodiment has been omitted. Because the minimum width (12 μm) of the ground trace 71 according to the first embodiment is less than the minimum width (40 μm) of the frame portion 29 according to the second embodiment, space-saving can be achieved for the metal base 20. As a result, the degree of design freedom in designing the flexure 10 is improved, and a hard disk drive can be made compact.

The first embodiment enables both the space-saving and good electrical characteristics to be satisfied in a flexure with conductors for a multi-reader.

[Fourth and Fifth Embodiments]

Next, the fourth and fifth embodiments will be described with reference to FIGS. 8 and 10. It should be noted that the fourth and fifth embodiments may also be referred to as third and fourth reference examples, respectively.

The fourth embodiment is different from the first embodiment in that no grounding point is provided in either of a first end portion 71a and a second end portion 71b of a ground trace 71. That is, while the ground trace 71 is arranged, neither of the end portions is grounded. The other structures are the same as the structures of the first embodiment.

The fifth embodiment is different from the first embodiment in that a grounding point is provided in only one of a first end portion 71a and a second end portion 71b of a ground trace 71. That is, while the ground trace 71 is arranged, only one of the end portions is grounded. The other structures are the same as the structures of the first embodiment.

Figure 10:
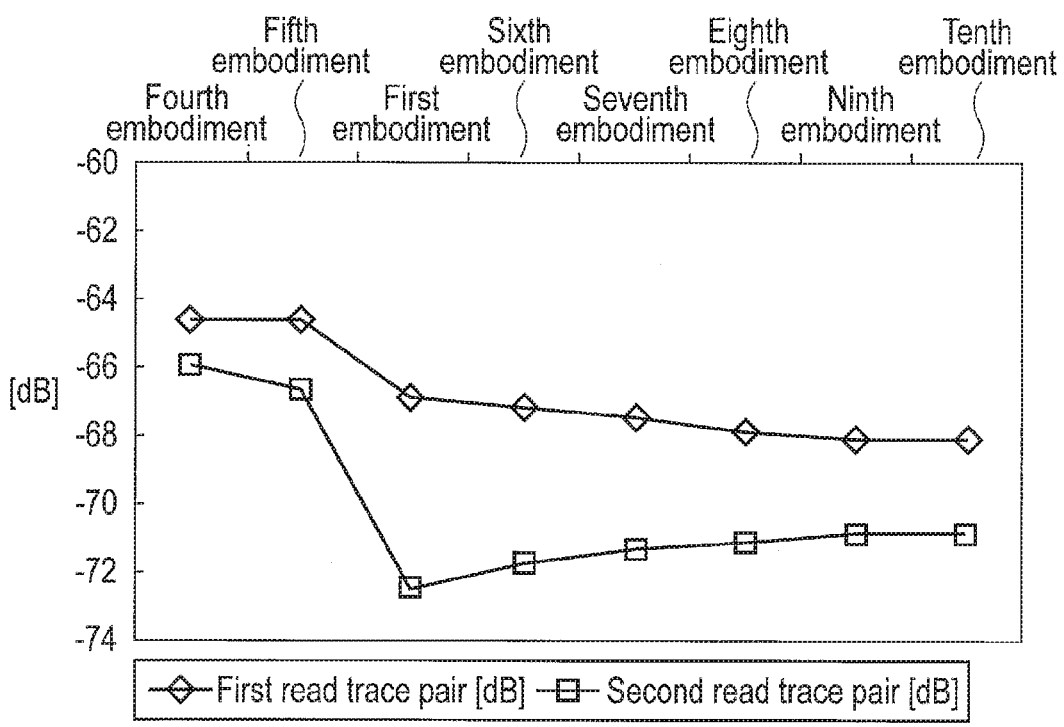
FIG. 10 is a characteristic diagram showing crosstalk that affects first and second read trace pairs according to fourth to tenth embodiments calculated by the analytical model of FIG. 8.

FIG. 10 is a characteristic diagram showing a result of calculating the analytical model shown in FIG. 8 by a circuit simulator with respect to the crosstalk of the fourth to tenth embodiments. The vertical axis of the graph represents the crosstalk that affects first and the second read trace pairs 51 and 52 caused by a write trace pair 40. As illustrated in the drawing, in the fourth and fifth embodiments, the crosstalk is not so much reduced as compared to the first embodiment. On the contrary, since a signal of the write trace pair 40 is transmitted via the ground trace 71, crosstalk that affects the first and the second read trace pairs 51 and 52 caused by the write trace pair 40 is increased.

[Sixth to Tenth Embodiments]

Next, the sixth to tenth embodiments will be described with reference to FIGS. 8 and 10. The sixth embodiment is different from the first embodiment in that in addition to first and second end portions 71a and 71b of a ground trace 71, at a place (a mid-point 71c) where a length between the first end portion 71a and the second end portion 71b is bisected, a grounding point is further provided (in other words, an additional grounding point is provided). The other structures are the same as the structures of the first embodiment.

The seventh embodiment is different from the first embodiment in that in addition to first and second end portions 71a and 71b of a ground trace 71, at three places where a length between the first end portion 71a and the second end portion 71b is substantially quadrisected (i.e., positions between 1-mm models M7 and M8, between M15 and M16 [a mid-point 71c], and between M23 and M24), grounding points are further provided (in other words, three additional grounding points are provided). The other structures are the same as the structures of the first embodiment.

The eighth embodiment is different from the first embodiment in that in addition to first and second end portions 71a and 71b of a ground trace 71, at seven places where a length between the first end portion 71a and the second end portion 71b is substantially divided into eight equal parts (i.e., positions between 1-mm models M3 and M4, between M7 and M8, between M11 and M12, between M15 and M16, between M19 and M20, between M23 and M24, and between M27 and M28), grounding points are further provided (in other words, seven additional grounding points are provided). The other structures are the same as the structures of the first embodiment.

The ninth embodiment is different from the first embodiment in that in addition to first and second end portions 71a and 71b of a ground trace 71, at fourteen places where a length between the first end portion 71a and the second end portion 71b is divided into fifteen equal parts at an interval of 2 mm, grounding points are further provided (in other words, fourteen additional grounding points are provided). The other structures are the same as the structures of the first embodiment.

The tenth embodiment is different from the first embodiment in that in addition to first and second end portions 71a and 71b of a ground trace 71, at twenty nine places were a length between the first end portion 71a and the second end portion 71b is divided into 30 equal parts at an interval of 1 mm, grounding points are further provided (in other words, twenty nine additional grounding points are provided). The other structures are the same as the structures of the first embodiment.

For the respective embodiments, analytical results of FIG. 10 are compared. In comparing the first and sixth to tenth embodiments with the fourth and fifth embodiments, crosstalk that affects first and second read trace pairs 51 and 52 is far more reduced in the embodiments in which the grounding points are provided on the two end portions (i.e., the first and sixth to tenth embodiments) as compared to the embodiments in which the two end portions are not provided with grounding points (i.e., the fourth and fifth embodiments).

Meanwhile, in comparing the sixth to tenth embodiments with the first embodiment, it can be understood that no great improvement in the crosstalk is shown even if additional grounding points are provided in the first embodiment. On the contrary, limited to the first read trace pair 51, crosstalk is slightly increased in the sixth to tenth embodiments as compared to the first embodiment.

[Eleventh Embodiment]

Figure 11:
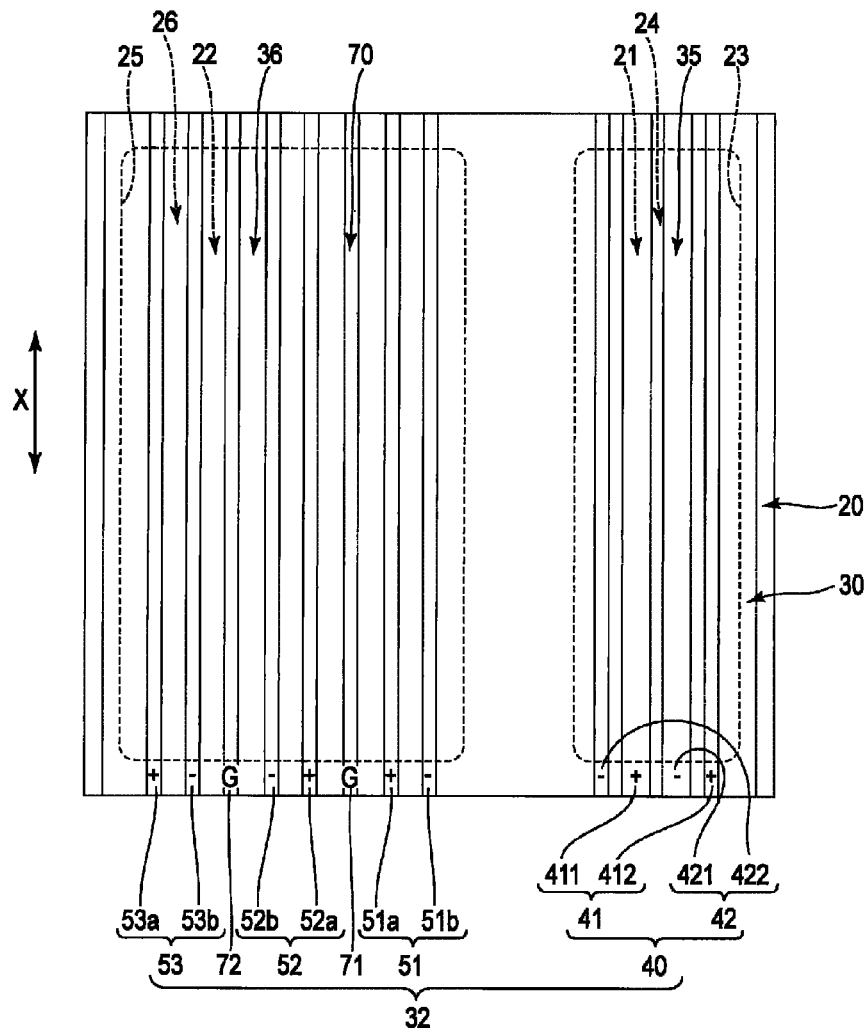
FIG. 11 is an illustration which schematically depicts an interconnection part according to an eleventh embodiment.

Referring to FIG. 11, an eleventh embodiment will be described. The eleventh embodiment is different from the first embodiment in that a reproduction element 4c, a third read trace pair 53, and a second ground trace 72 are further provided. The other structures are the same as the structures of the first embodiment.

The third read, trace pair 53 is constituted of a positive read trace 53a and a negative read trace 53b, which form a pair and transmit a differential signal. The positive read trace 53a and the negative read trace 53b are connected to the reproduction element 4c which is not shown. The positive (positive phase signal) read trace 53a transmits a signal which fluctuates between high- and low-level binary values. The negative (reverse phase signal) read trace 53b transmits a signal which fluctuates between the binary values at an opposite phase with respect to the signal of the positive read trace 53a. The positive and negative read traces 53a and 53b are examples of the pair of read traces of the present invention, respectively. The third read trace pair 53 is an example of the read trace pair of the present invention, and may be referred to simply as read trace pair 53. The third read trace pair 53 is arranged farther from a write trace pair 40 as compared to first and second read trace pairs 51 and 52, and is provided on a second lane 36 such that it faces a window portion 26 of a second area 22 of a metal base 20 in the thickness direction Y. The second ground trace 72 is arranged between the second and the third read trace pairs, and comprises a first end portion 72a, and a second end portion 72b which is on the opposite side of the first end portion 72a. The second ground trace 72 is provided with grounding points at the first and second end portions (both ends) 72a and 72b, respectively, and is electrically connected (grounded) to the metal base 20. The second ground trace 72 is an example of the ground trace of the present invention, and may be referred to simply as ground trace 72. A plurality of ground traces may be called a ground trace structure 70 as a whole. In the eleventh embodiment, a ground trace is arranged between all adjacent pairs of read traces. From another perspective, it can be said that the read trace pair (a pair of positive and negative read traces), and the ground trace are arranged alternately. The above applies when four or more pairs of read traces are provided (i.e., that the number of spaces between the pairs of read traces is three or more).

In the eleventh embodiment, it is possible to adjust the capacitance of all of the read trace pairs 51, 52, and 53, and suppress crosstalk from the write trace pair 40 to the minimum.

[Twelfth Embodiment]

A twelfth embodiment will be described. The twelfth embodiment is a modification of the eleventh embodiment. The twelfth embodiment is different from the eleventh embodiment in that a ground trace 71 is arranged between only a first read trace pair 51 and a second read trace pair 52 among pairs of read traces which are adjacent to each other. The other structures are the same as the structures of the eleventh embodiment. The above applies when four or more pairs of read traces are provided (i.e., that the number of spaces between the pairs of read traces is three or more).

In the twelfth embodiment, when a ground trace cannot be arranged between all pairs of read traces because of insufficient space, etc., the ground trace is arranged preferentially to the first read trace pair 51 which is most likely to be affected by the crosstalk, thereby adjusting the capacitance. As a result, even if a flexure 10 only has a minimum required number of ground traces 71, crosstalk from the write trace pair can be suppressed in the flexure 10 as a whole.

[Thirteenth Embodiment]

Figure 12:
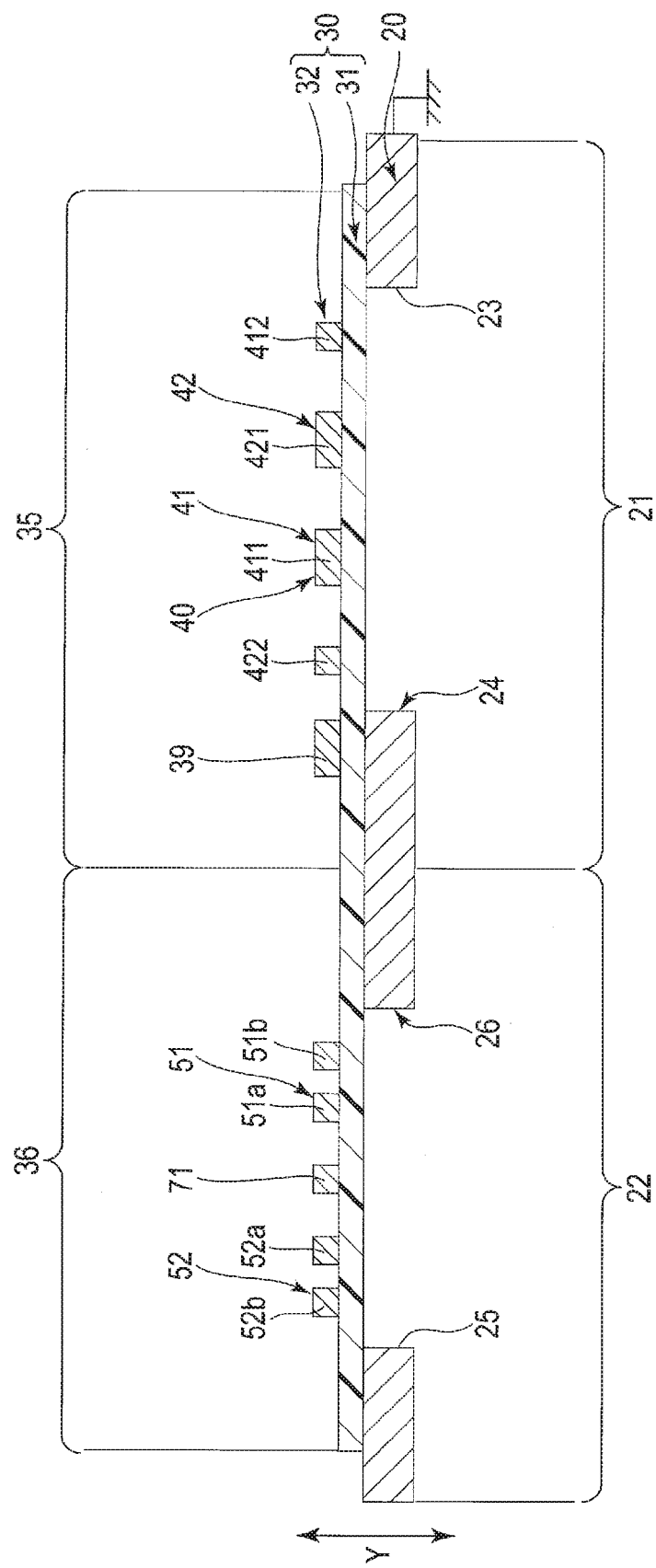
FIG. 12 is a cross-sectional view of an interconnection part according to a thirteenth embodiment.

Referring to FIG. 12, a thirteenth embodiment will be described. The thirteenth embodiment is different from the first embodiment in that an additional conductor 39 is provided. The other structures are the same as the structures of the first embodiment. An example of the additional conductor 39 is a heater line for conducting electricity to a heater element which adjusts a fly height of a slider 8. The additional conductor 39 is disposed on a first lane 35 of an insulating layer 31. In other words, the additional conductor 39 is not disposed on a second lane 36.

If the additional conductor 39 is arranged between first and second read trace pairs 51 and 52, impedance values of the first and second read trace pairs 51 and 52 may be varied. Further, crosstalk from a write trace pair 40 relayed by the additional conductor 39 may adversely affect the first and second read trace pairs 51 and 52. In the thirteenth embodiment, since the additional conductor 39 is arranged in a portion other than over the second lane 36 (i.e., the first lane 35), the additional conductor 39 is not to be arranged between the first and the second read trace pairs 51 and 52. Since a conductor 32 which is arranged between the read trace pairs 51 and 52 that are susceptible to noise is only a ground trace 71, it is possible to suppress the influence of crosstalk from the write trace pair 40.

[Fourteenth Embodiment]

Referring to FIG. 13, a fourteenth embodiment will be described. The fourteenth embodiment is different from the first embodiment in that a ground trace 71 includes an extended portion 79 which extends from a second end portion 71b. That is, no grounding point is provided on an apparent end portion (extended portion 79) of the ground trace 71. At a side more toward the interior than the extended portion 79 (i.e, at a section between first and second end portions 71a and 71b), grounding points are provided.

In the fourteenth embodiment, it is possible to adjust the capacitance of the first and second read trace pairs 51 and 52 over an area from the first end portion 71a to the second end portion 71b which are provided with the grounding points, respectively, and suppress crosstalk from a write trace pair 40.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The flexure with conductors for a multi-reader includes various modifications in which a ground trace having at least two grounding points is arranged between pairs of read traces which are adjacent to each other, and the ground points are arranged near at least two ends of a section which is desired to have good electrical characteristics.

What is claimed is:

1. A flexure comprising a metal base and an interconnection part formed on the metal base, the flexure being configured to mount a recording element and a plurality of reproduction elements thereon, the metal base comprising:
a first area extending in a longitudinal direction of the metal base; and
a second area extending along the first area and in which a window portion is formed, the interconnection part comprising:
an insulating layer comprising a first lane which covers the first area, and a second lane which covers both the window portion and the second area;
a write trace pair, which is provided on the first lane, is constituted of a first write trace and a second write trace which form a pair and transmit a differential signal, and is connected to the recording element;
read trace pairs which are provided on the second lane to face the window portion in a thickness direction of the metal base, each of the read trace pairs being constituted of a first read trace and a second read trace which form a pair and transmit a differential signal, the read trace pairs being connected to the reproduction elements respectively; and
a ground trace which is arranged between two adjacent read trace pairs, comprises a first end portion and a second end portion, and is provided with grounding points at the first end portion and the second end portion, respectively.

2. The flexure of claim 1, wherein the first read trace and the second read trace are arranged such that a distance between the first read trace and the ground trace is substantially equal to a distance between the second read trace and an edge of the window portion.

3. The flexure of claim 2, wherein the ground trace comprises an additional grounding point which is further provided at a point between the first end portion and the second end portion of the ground trace.

4. The flexure of claim 1, wherein:
the read trace pairs include a first read trace pair, which is closest to the write trace pair, and a second read trace pair, which is close to the write trace pair next to the first read trace pair; and
the ground trace is arranged between the first read trace pair and the second read trace pair.

5. The flexure of claim 4, wherein the ground trace comprises an additional grounding point which is further provided at a point between the first end portion and the second end portion of the ground trace.

6. The flexure of claim 1, wherein the ground trace is arranged between all adjacent read trace pairs.

7. The flexure of claim 6, wherein the ground trace comprises an additional grounding point which is further provided at a point between the first end portion and the second end portion of the ground trace.

8. The flexure of claim 1, wherein the ground trace comprises an additional grounding point which is further provided at a point between the first end portion and the second end portion of the ground trace.

9. The flexure of claim 1, wherein a width of the ground trace, a width of the first read trace, and a width of the second read trace are substantially equal to each other.

10. The flexure of claim 1, wherein the interconnection part comprises an additional conductor arranged in a portion other than over the second lane.

11. The flexure of claim 1, wherein the ground trace comprises an extended portion which extends from the first end portion and/or the second end portion.

* * * * *